US009317680B2

(12) United States Patent
Carter, III et al.

(10) Patent No.: US 9,317,680 B2
(45) Date of Patent: Apr. 19, 2016

(54) METHOD AND SYSTEM FOR PROTECTING AGAINST UNKNOWN MALICIOUS ACTIVITIES BY DETERMINING A REPUTATION OF A LINK

(75) Inventors: Russell Bertrand Carter, III, San Jose, CA (US); Pravat Kumar Lall, Sunnyvale, CA (US); Geoff Oitment, Kitchener (CA); Davoud Maha, Sunnyvale, CA (US); Javed Hasan, Saratoga, CA (US)

(73) Assignee: McAfee, Inc., Santa Clara, CA (US)

( * ) Notice: Subject to any disclaimer, the term of this patent is extended or adjusted under 35 U.S.C. 154(b) by 816 days.

(21) Appl. No.: 12/908,477

(22) Filed: Oct. 20, 2010

(65) Prior Publication Data

US 2012/0102545 A1    Apr. 26, 2012

(51) Int. Cl.
*G06F 21/51*    (2013.01)
*G06F 17/30*    (2006.01)
*H04L 29/06*    (2006.01)

(52) U.S. Cl.
CPC .......... *G06F 21/51* (2013.01); *G06F 17/30864* (2013.01); *H04L 63/101* (2013.01); *H04L 63/1425* (2013.01); *H04L 63/1483* (2013.01); *G06F 2221/2119* (2013.01)

(58) Field of Classification Search
CPC ... H04L 63/20; H04L 63/102; H04L 63/1433; H04L 63/14; H04L 63/10; H04L 63/1408; G06F 21/577; G06F 21/51; G06F 17/30864
USPC .............. 726/1, 2, 3, 22, 23, 24, 25
See application file for complete search history.

(56) References Cited

U.S. PATENT DOCUMENTS

| 2006/0253458 A1 | 11/2006 | Dixon et al. ............ 707/10 |
| 2006/0253581 A1 | 11/2006 | Dixon et al. |
| 2007/0039038 A1 | 2/2007 | Goodman et al. .......... 726/2 |
| 2007/0208822 A1 | 9/2007 | Wang et al. |
| 2009/0094697 A1* | 4/2009 | Provos et al. .......... 726/23 |
| 2009/0300012 A1 | 12/2009 | Levow et al. .......... 707/6 |
| 2010/0186088 A1 | 7/2010 | Banerjee et al. .......... 726/23 |
| 2010/0269168 A1* | 10/2010 | Hegli et al. .......... 726/11 |

(Continued)

FOREIGN PATENT DOCUMENTS

| JP | 2007-122692 A | 5/2007 |
| JP | 2008-165632 A | 7/2008 |

(Continued)

OTHER PUBLICATIONS

International Search Report and Written Opinion; PCT/US2011/056663; pp. 9, Apr. 18, 2012.
International Preliminary Report on Patentability; PCT/US2011/056663; pp. 6, May 2, 2013.
Office Action received for Korean Patent Application No. 10-2013-7012907, mailed on Jun. 26, 2014, 6 pages of English Translation and 7 pages of Korean Office Action.

(Continued)

*Primary Examiner* — Eleni Shiferaw
*Assistant Examiner* — Alexander Lapian
(74) *Attorney, Agent, or Firm* — Baker Botts L.L.P.

(57) ABSTRACT

A method and system for protecting against unknown malicious activities by determining a reputation of a link are disclosed. A reputation server queries a database including reputation information associated with a plurality of links to retrieve a reputation of a redirected link. The reputation information may indicate whether the links are associated with a malicious activity. The reputation of the redirected link may be associated with the original link to create a reputation of the original link.

24 Claims, 6 Drawing Sheets

(56) References Cited

U.S. PATENT DOCUMENTS

2011/0145435 A1* 6/2011 Bhatawdekar et al. ....... 709/238
2011/0191849 A1* 8/2011 Jayaraman et al. ............ 726/23

FOREIGN PATENT DOCUMENTS

| WO | 2007/037524 A1 | 4/2007 |
| WO | WO 2007/136665 | 11/2007 |
| WO | 2012/054449 A2 | 4/2012 |
| WO | 2012/054449 A3 | 7/2012 |

OTHER PUBLICATIONS

Office Action received for Japanese Patent Application No. 2013-534998, mailed on Jun. 3, 2014, 4 pages of English Translation and 3 pages of Japanese Office Action.
Chinese Office Action issued in Patent Appl. No. 201180050516.1; 19 pages w/ English Translation, Jan. 20, 2015.
European Search Report; Appl. No. 11834976.0; 6 pages, Jul. 2, 2014.

* cited by examiner

FIG. 6

METHOD AND SYSTEM FOR PROTECTING AGAINST UNKNOWN MALICIOUS ACTIVITIES BY DETERMINING A REPUTATION OF A LINK

TECHNICAL FIELD OF THE INVENTION

The present invention relates generally to computer security and malware protection and, more particularly, to a method and system for protecting against unknown malicious activities by determining a reputation of a link.

BACKGROUND

Site crawlers and web rating security applications may be used to determine a rating for websites accessible via the Internet. Site crawlers may be used to gather information (e.g., the content of a website) by visiting the websites. This information may then be used by a web rating security application to, for example, determine a reputation for each site visited. This reputation may then be used to determine whether the particular site is a safe site or is associated with a malicious activity.

These applications, however, are not able to address several online security risks. For example, site crawlers cannot detect content and links, such as user profiles and online interactive experiences within social networks, that are only accessible by entering a password. Additionally, site crawlers traditionally find content via crawling a site but do not know what link the users of the site click on and the contents of those links. Many hackers have also learned how to circumvent web rating security applications by cloaking the payload or destination associated with the link behind multiple redirects and shortened Uniform Resource Locators (URLs).

SUMMARY

In accordance with the present disclosure, the disadvantages and problems associated with protecting against unknown malicious activities have been substantially reduced or eliminated. In a particular embodiment, a method for determining a reputation of a link includes querying a database including reputation information associated with a plurality of links by a reputation server to retrieve a reputation of a redirected link. The reputation information may indicate whether the links are associated with a malicious activity. The reputation of the redirected link is associated with an original link to create a reputation of the original link.

In accordance with one embodiment of the present disclosure, a system for determining a reputation of a link includes a database having reputation information associated with a plurality of links, a processor, a computer readable memory and processing instructions encoded in the computer readable memory. The reputation information may indicate whether the links are associated with a malicious activity. The processing instructions, when executed by the processor, may be operable to perform operations including querying the database to retrieve a reputation of a redirected link and associating the reputation of the redirected link with an original link to create a reputation of the original link.

In accordance with another embodiment of the present disclosure, a non-transitory computer readable medium stores instructions for determining a reputation of a link. The instructions are configured to, when executed by a processor, record an original link and a redirected link associated with the original link at a client and send the original link and the redirected link to a reputation server operable to determine a reputation of the original link based on a reputation of the redirected link by querying a database including reputation information for a plurality of links. The reputation information may indicate whether the original link is associated with a malicious activity. The instructions may also be configured to receive a notification from the reputation server at the client including the reputation of the original link indicating whether the original link is associated with a malicious activity.

In accordance with a further embodiment of the present disclosure, a method for determining a reputation of a link includes querying a database including reputation information associated with a plurality of links by a reputation server to retrieve a reputation of each of a plurality of redirected links. The reputation information may indicate whether the links are associated with a malicious activity. The reputation of an original link is determined based on at least one of the reputation of the redirected link of the plurality of links including a lowest reputation score, an average reputation score of the reputations of the plurality of redirected links and the reputation of the redirected link representing a final destination for the original link.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present disclosure and their advantages are best understood by reference to FIGS. 1 through 6, where like numbers are used to indicate like and corresponding parts.

Figure 1:
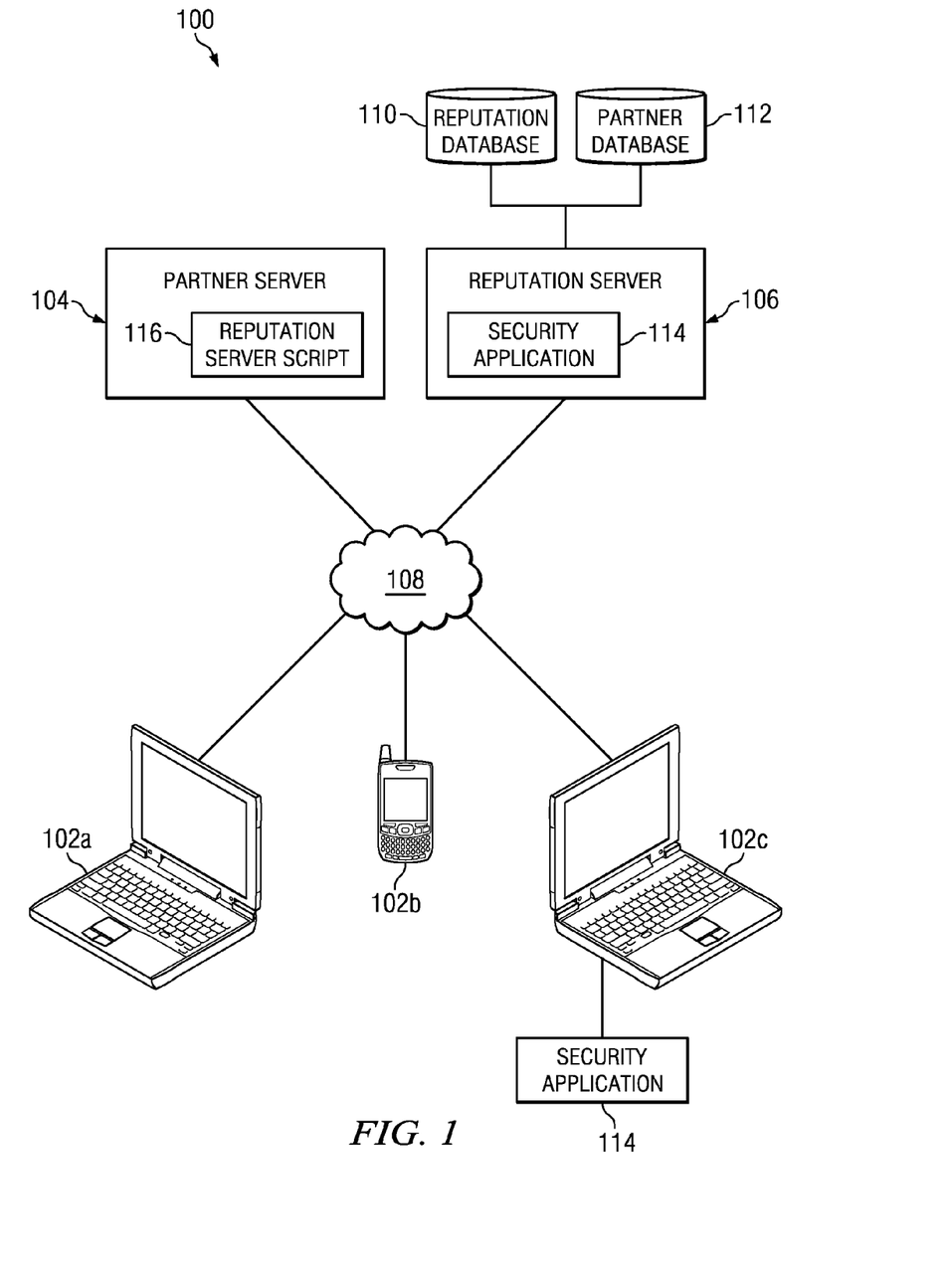
FIG. 1 illustrates a block diagram of a network including a security application for protecting against unknown malicious activities by determining a reputation of a link in accordance with the teachings of the present disclosure.

FIG. 1 illustrates a block diagram of a network including a security application for protecting against unknown malicious activities by determining a reputation of a link in accordance with the teachings of the present disclosure. Malicious activities may be in the form of digital content that produces unwanted activity in a system. Types of malicious activities may include, but are not limited to, viruses, Trojans, worms, spyware, unsolicited electronic messages, phishing attempts, or any combination thereof.

System 100 may include clients 102, partner server 104 and reputation server 106 communicatively coupled to network 108. Clients 102 may be any electronic device configured to interpret and/or execute program instructions and/or process data, including, but not limited to, a computer, a personal digital assistant or a phone. Partner server 104 may be any server configured to host a site including a collection of data that may be accessed using a common address. For example, the data may be accessed by using one or more of the Hypertext Transfer Protocol (HTTP), HTTP Secure (HTTPS), the File Transfer Protocol (FTP), the Telnet Protocol, Secure Shell Protocol (SSH), the Simple Mail Transfer Protocol (SMTP), or any other available protocol to access data via the Internet. Reputation server 106 may be configured to interpret and/or execute program instructions and/or process data. In the illustrated embodiment, reputation database 110 and partner database 112 may be communicatively coupled to reputation server 106. Reputation database 110 and partner database 112 may be configured to store a collection of organized data that is accessible by one or more users. Although the illustrated embodiment shows that reputation database 110 and partner database 112 are directly coupled to reputation server, reputation database 110 and partner database 112 may be remotely coupled to reputation server 106 via, for example, network 108.

Although a specific network is illustrated in FIG. 1, the term "network" may be interpreted as generically defining any network capable of transmitting telecommunication signals, data and/or messages. Network 108 represents any suitable collection and arrangement of communications equipment supporting the transport and delivery of data. For example, network 108 may be one or a collection of components associated with a local area network (LAN), a wide area network (WAN), a back-haul network, a global computer network such as the Internet, or any other communications equipment suitable for providing wireless and/or wireline communications. In a particular embodiment, network 108 may be an Internet Protocol (IP) network.

In the illustrated embodiment, client 102c and reputation server 106 may include security application 114 that operates to protect against unknown malicious activities by using a reputation associated with a link. Additionally, partner server 104 may include reputation server script 116 that operates to point any outbound links (e.g., links that navigate off the partner site) located on a site hosted by partner server 104 to reputation server 106.

In operation, system 100 may determine whether a link is associated with a malicious activity based on a reputation for the link and a protection policy. Reputation information associated with one or more links may be stored in database 110 associated with reputation server 106. The reputation information may include an indication of whether the link has been rated as being safe or unsafe or the link is unknown, a reputation score for the link and a classification of the link based on content. In other embodiments, any other suitable type of information associated with a link such as traffic patterns and site behavior for the link may be included in the reputation information. The protection policy may be stored on clients 102 and/or reputation server 106. The protection policy may include rules for determining when client 102 may be blocked from navigating to a link. For example, the rules may be based on the reputation information for a link. In one embodiment, a rule may indicate that the link should be blocked when the link has a reputation score lower than a minimum threshold and when the classification indicates that the content is a malicious activity. In other embodiments, the rules may be based on any combination of reputation information found in reputation database 110.

A user at one of clients 102 may click on a link in order to access data on a site via network 108. The link may be accessed through any application such as a desktop application (e.g., a browser application, an email application, a word processing application, etc.), a server application and a web service in order to access content via network 108. In one embodiment, the link may include a Uniform Resource Locator (URL) that specifies where an identified resource is available and the mechanism for retrieving it. In another embodiment, the link may include an IP address that identifies and locates the requested information.

In some embodiments, the link may not represent the final destination for accessing the data and the link may be redirected one or more times. If the user clicks on the link at client 102c, any redirections may be recorded by security application 114 on client 102c. The information for the link and associated redirections may then be sent from client 102c to reputation server 106 via network 108. If the user clicks on the link at either of clients 102a and 102b and the link is on a partner site hosted by partner server 104, reputation server script 116 operates to point the link to reputation server 106 such that security application 114 on reputation server 106 records any redirections associated with the link. The recorded information for the link may include, but is not limited to, identification information, such as a URL or an IP address.

Reputation server 106 may use the URL or IP address of the link and any associated redirections to retrieve reputation information associated with the link and any associated redirections from reputation database 110 in order to determine the reputation of the link. In one embodiment, the reputation of the link may be based on the redirection having the lowest reputation score. In another embodiment, the reputation for the link may be based on an average of the reputation scores for the link and any associated redirections. In a further embodiment, the reputation for the link may be based on the reputation information for the final destination (e.g., the last redirection). Reputation server 106 may then calculate a policy intersection for the link by comparing the reputation associated with the link with the protection policy. If the policy intersection indicates that the link is associated with a malicious activity, client 102 will be redirected to a safe page that displays information to a user at client 102 indicating that the link is associated with a malicious activity. If the reputation information for the link indicates that the link is not associated with a malicious activity, client 102 will navigate to the site associated with the link to display the requested data to the user.

In one embodiment, database 110 may not include reputation information for the link and/or the associated redirections. In this case, the reputation information for the link and/or the associated redirections may be determined by reputation server 106 and stored in database 110. In another embodiment, the reputation information associated with the link may not match the reputation information associated with one or more of the associated redirections. In this case, the reputation information of the link stored in database 110 may be updated to match the reputation information associated with one or more of the redirections. In one embodiment, the reputation information for the link may be updated based on the redirection having the lowest reputation score. In another embodiment, the reputation for the link may be updated based on an average of the reputation scores for the link and any associated redirections. In a further embodiment, the reputation for the link may be updated based on the reputation information for the final destination (e.g., the last redirection).

Figure 2:
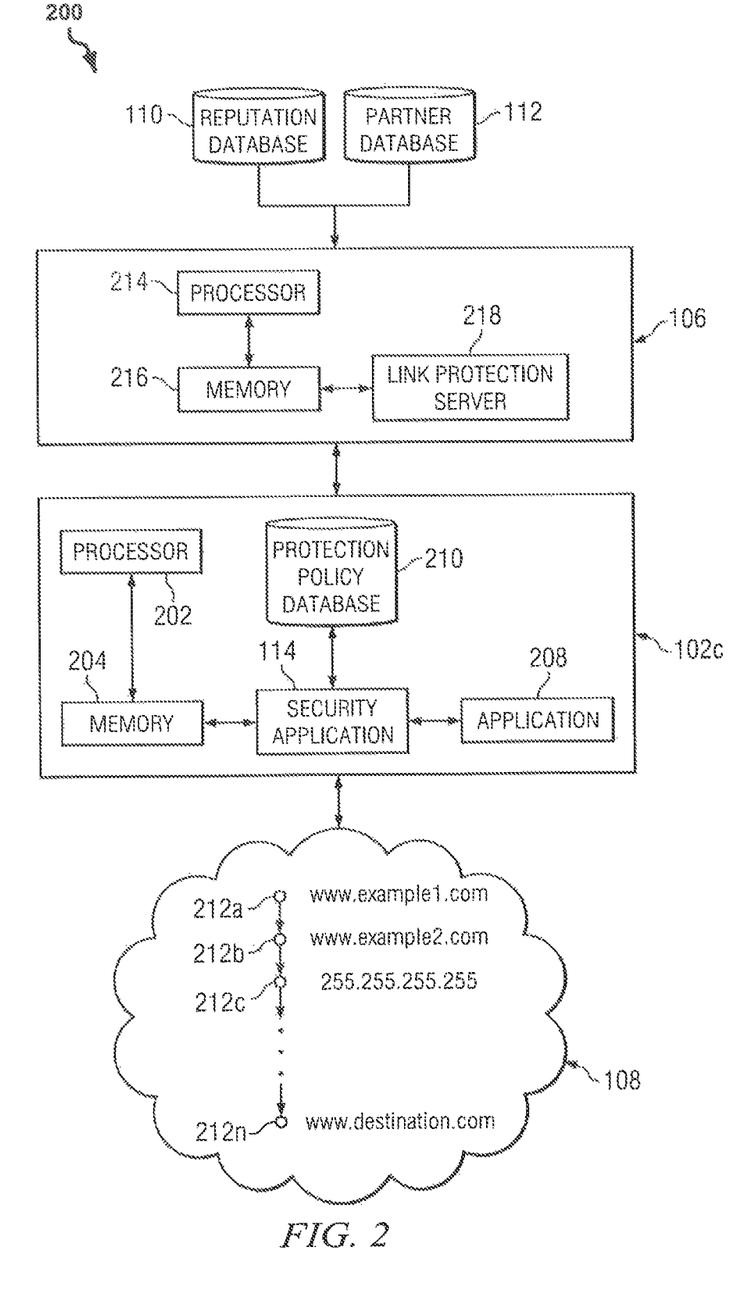
FIG. 2 illustrates a block diagram of a system including a security application for protecting against unknown malicious activities by determining a reputation of a link in accordance with the teachings of the present disclosure.

FIG. 2 illustrates a block diagram of a system including a security application for protecting against unknown malicious activities by determining a reputation of a link in accordance with the teachings of the present disclosure. Specifically, system 200 may include client 102c, reputation server 106, reputation database 110 and partner database 112.

Client 102c may include processor 202 functionally coupled to memory 204. In certain embodiments, processor 202 may be, for example, a microprocessor, microcontroller, digital signal processor (DSP), application specific integrated circuit (ASIC), or any other digital or analog circuitry configured to interpret and/or execute program instructions and/or process data. In some embodiments, processor 202 may interpret and/or execute program instructions and/or process data stored in memory 204. Memory 204 may include any system, device, or apparatus configured to store one or more memory modules. Each memory module may include any system, device or apparatus configured to retain program instructions and/or data for a period of time (e.g., computer-readable media). For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Client 102c may also include security application 114 and application 208, which may be executed by processor 202 while stored in memory 204. Security application 114 may be an application that is configured to record information associated with a link accessible from application 208 when a user at client 102c clicks on the link, communicate with reputation server 106 and prevent client 102c from accessing a link that is associated with a malicious activity. Application 208 may be a process, an executable, a shared library, a driver, a device driver, a run-time-engine, an operating system, object code, or any other binary instructions configured to be executed by client 102c. In specific embodiments, application 208 may include, but is not limited to, a browser application, an email application, a word processing application, a spreadsheet application, a presentation application, an application that supports the portable document format (PDF) or any other suitable desktop application.

In the illustrated embodiment, protection policy database 210 may be a module configured to be executed by processor 202 on client 102c. Protection policy database 210 may be functionally coupled to memory 204 and security application 114. In another embodiment, protection policy database 210 may be a sub-module of security application 114. In a further embodiment, one or both of security application 114 or protection policy database 210 be remote from client 102c such that they reside on a device in a cloud computing server accessible over a network, such as network 108. In a further embodiment, one or both of security application 114 or protection policy database 210 may reside on and be executed by reputation server 106.

Protection policy database 210 may be implemented in any suitable way to adequately provide information to security application 114 concerning rules for determining when client 102c should be prevented from navigating to the link. In one embodiment, protection policy database 210 may be a database. In another embodiment, protection policy database 210 may be a functional library with data storage. In a further embodiment, protection policy database 210 may be a look-up table. As described in more detail below, security application 114 may be configured to monitor application operations, such as when a user clicks on a link within application 208 to access data on a site, compare reputation information associated with the link to the rules a the protection policy included in policy protection database 210, and prevent client 102c from navigating to the link if reputation and the protection policy indicated that the link is associated with a malicious activity.

Reputation server 106 may be configured to interpret and/or execute program instructions and/or process data. Reputation server 106 may include processor 214, memory 216 and link protection server 218. In certain embodiments, processor 214 may be, for example, a microprocessor, microcontroller, digital signal processor (DSP), application specific integrated circuit (ASIC), or any other digital or analog circuitry configured to interpret and/or execute program instructions and/or process data. In some embodiments, processor 214 may interpret and/or execute program instructions and/or process data stored in memory 216. Memory 216 may include any system, device, or apparatus configured to store one or more memory modules. Each memory module may include any system, device or apparatus configured to retain program instructions and/or data for a period of time (e.g., computer-readable media). Reputation server 106 may reside in a any suitable network location such that reputation server 106 maybe communicatively coupled to client 102c over a network, such as network 108.

Link protection server 218 may be executed by processor 214 and stored in memory 216. Link protection server 218 may be communicatively coupled to security application 114 in client 102. In one embodiment, link protection server 218 and security application 114 may communicate through the Internet Protocol Suite. Link protection server 218 may be communicatively coupled to security application 114 over a network, such as network 108. Link protection server 218 may be configured to query reputation database 110 for reputation information associated with a link and query partner database 112 for partner policy information, determine the reputation for the link and communicate the reputation for the link to security application 114 on client 102c.

In another embodiment, security application 114 may be included in reputation server 106 such that link protection server 218 may be functionally coupled to security application 114. In this embodiment, a client, such as clients 102a and 102b illustrated in FIG. 1, may be protected from unknown malicious activities even when security application 114 is not installed on the client. For example, if a user at one of clients 102a or 102b clicks on a link within a partner site hosted by partner server 104, reputation server script 116 on partner server 104 points the link to reputation server 106. Because security application 114 is included on reputation server 106, security application 114 may record the link and any associated redirections and combine with link protection server 218 to determine whether the link is associated with a malicious activity.

Reputation database 110 and/or partner database 112 may reside on reputation server 106, or may be located on another device. Reputation database 110 and/or partner database 112 may be implemented in any manner suitable to provide storage and access to information concerning links. In one embodiment, reputation database 110 and/or partner database 112 may be a database. In another embodiment, reputation database 110 and/or partner database 112 may be a functional library with data storage. In a further embodiment, reputation database 110 and/or partner database 112 may be a look-up table. Reputation database 110 and/or partner database 112 may be separate from each other, or may be combined into a fewer number of databases. Reputation database 110 and/or partner database 112 may be communicatively coupled to each other or to reputation server 106 over a network such as network 108. Reputation database 110 and/or partner database 112 may be accessible by use of database queries from reputation server 106.

In operation, a user at client 102c may click on link 212a in application 208 to access data from a site via network 108. Security application 114 may determine whether link 212a includes one or more redirections. For example, link 212a may be redirected to link 212b and link 212c (e.g., intermediate destinations) and finally to link 212n (e.g., the final destination). In this case, security application 114 may record information associated with each of links 212a, 212b, 212c and 212n. The information recorded for each of links 212 may include an associated domain name or URL and/or an IP address. Security application 114 may additionally access protection policy database 210 to retrieve a protection policy that includes rules on when client 102c should be prevented from navigating to the link. Security application 114 may then send the information associated with each of links 212a, 212b, 212c and 212n and the protection policy to link protection server 218 on reputation server 106. In another embodiment, security application 114 may only send the information associated with each of links 212a, 212b, 212c and 212n to link protection server 218.

Link protection server 218 may use the information associated with each of links 212a, 212b, 212c and 212n to query reputation database 110 and retrieve a reputation associated with each of links 212a, 212b, 212c and 212n in order to determine a reputation for link 212a. If the reputation associated with link 212a matches the reputations associated with links 212b, 212c and 212n, link protection server 218 retrieves the reputation associated with link 212a. If the reputation associated with link 212a does not match the reputations associated with links 212b, 212c and 212n, link protection server 218 may determine the reputation associated with link 212 based on one or more of the reputations associated with links 212b, 212c and 212n. In one embodiment, the reputation associated with link 212a may be based on the one of links 212b, 212c and 212n having the lowest reputation score. In another embodiment, the reputation associated with link 212a may be based on an average of the reputation scores associated with links 212b, 212c and 212n. In a further embodiment, the reputation associated with link 212a may be based on the reputation information associated with link 212n, which is the final destination for link 212a. In any of these embodiments, link protection server 218 may update the reputation information associated with link 212a with the appropriate reputation information based on one or more of links 212b, 212c and 212n.

Once link protection server 218 determines the reputation for link 212a, link protection server 218 may calculate a policy intersection for link 212a based on the reputation and the protection policy. In some embodiments, link protection server 218 may not receive the protection policy from client 102 and may base the policy intersection for link 212a on the reputation. Reputation server 106 may then send the policy intersection for link 212a to client 102c. If client 102c did not send a protection policy to reputation server 106, client may use the reputation associated with link 212a received from reputation server 106 and a protection policy from protection policy database 210 to calculate the policy intersection associated with link 212a. If the policy intersection indicates that link 212a is associated with a malicious activity, client 102c may navigate to a safe page that indicates to the user that link 212a is associated with a malicious activity. If the policy intersection indicates that link 212a is not associated with a malicious activity, client 102 navigates to link 212n to display the requested data to the user.

Figure 3:
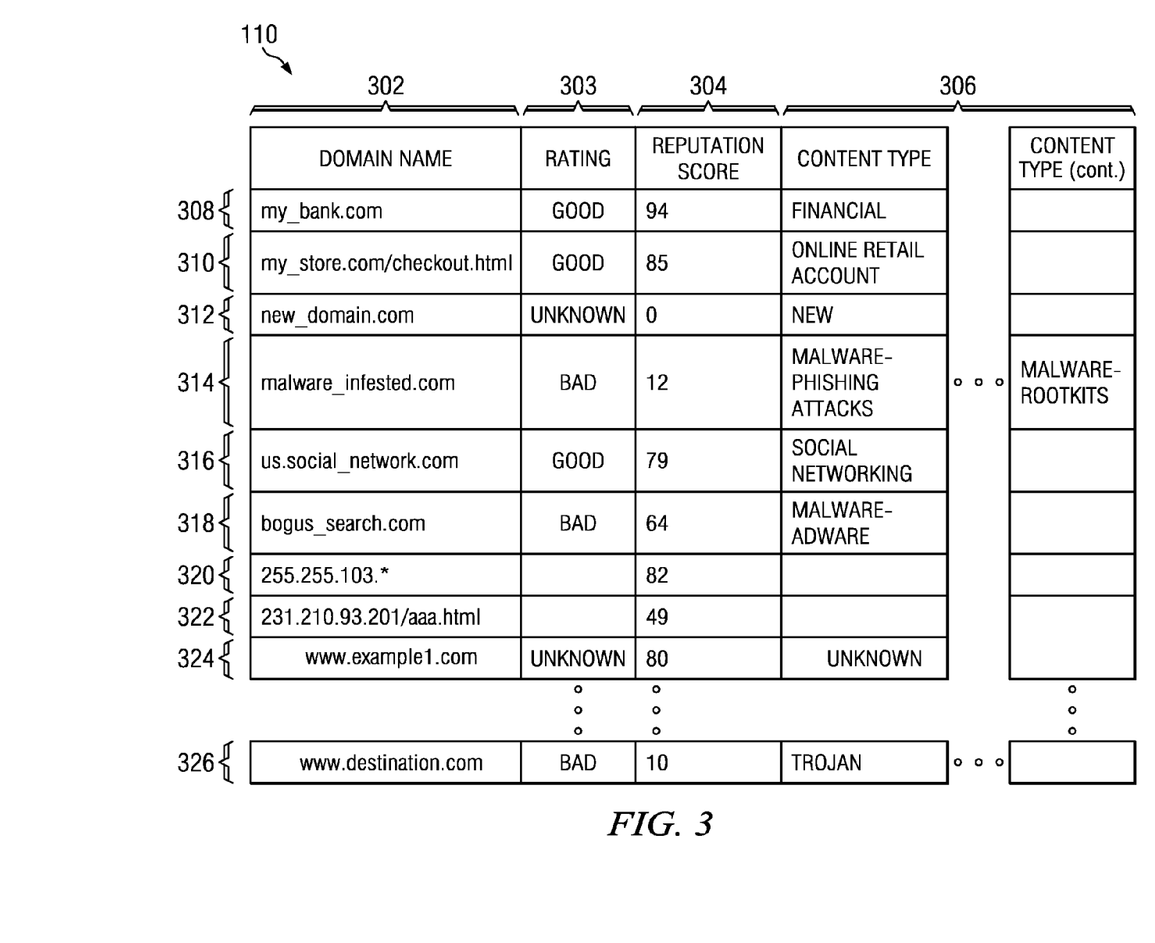
FIG. 3 illustrates a reputation database including reputation information for a plurality of links in accordance with the teachings of the present disclosure.

FIG. 3 illustrates a reputation database including reputation information for a plurality of links in accordance with the teachings of the present disclosure. Reputation database 110 may include information associating a link and the types of content that it contains with a reputation. Reputation database 110 may include a categorization or classification of the content for entries 308-326 representing various links. For example, each entry in reputation database 110 may include domain name field 302, rating field 303, reputation score field 304, and/or one or more content type fields 306. It should be noted that the domain names, URLs, addresses, classifications and categorizations used in reputation database 110 are provided for explanation purposes only.

Domain name field 302 may include a domain name, such as "my_bank.com" 308, an IP address with or without a wildcard matching all subdomains such as "255.255.103.*" 320, a domain with a specific URL address such as "my_store.com/checkout.html" 310, a domain with a specified subdomain such as "us.social_network.com" 316, or combinations of these, such as "231.210.93.201/aaa.html" 322. Rating field may include an indication of whether the domain indicated in domain name field 302 is safe or unsafe. For example, "my_bank.com" 308 includes a "GOOD" rating, which may indicate that the domain is safe to visit while "bogus_search.com" 318 includes a "BAD" rating, which may indicate that the domain is not safe to visit and may be associated with a malicious activity. Additionally, "new_domain.com" 312 may include an "UNKNOWN" rating indicating that the domain is not fully rated.

Reputation score field 304 may include a reputation score for the domain indicated in domain name field 302. A reputation score may indicate a quantitative rating of the soundness of the domain in terms of a lack of unwanted or malicious behavior. Reputation score may be calculated and maintained by any acceptable means for determining the soundness of a domain in terms of a lack of unwanted or malicious behavior. Many factors may be used to determine reputation score, including: whether the domain is a source of spam messages; whether the domain is the destination of links contained in spam messages; whether the domain is the destination of links contained in electronic messages that in turn contain malware; whether the domain is linked to by other domains or servers that host malware; the frequency and volume of electronic messages or traffic to or from the domain; the destination or source of electronic messages or traffic to or from the domain; the reputation of other domains hosted on the same servers or network as the domain; whether the domain's content is malware-free; whether the site host of the domain is deviating from known historical behavior; or whether the domain appears on a blacklist (indicating malicious sites) or a whitelist (indicating safe sites). The entries in reputation score field 304 may change as new information is used to populate reputation database 110. In one embodiment, the value of reputation score field 304 may range from 0 to 100, where 0 indicates the least degree of trustworthiness, and 100 indicates the greatest degree of trustworthiness of the domain. In one embodiment, a new entry into reputation database 110 without an existing reputation, such as entry "new_domain.com" 312 may be assigned a 0 for its reputation score.

Classification field 306 may include one or more fields containing an indicator for identifying the content of the domain. Classification field 306 may indicate generally or specifically the content of the domain. For example, in reputation database 110, "malware_infested.com" 314 is classified as "Malware—Phishing Attacks" as well as "Malware—Rootkits," indicating the site is known to contain phishing attack content as well as rootkit content. Classification field 306 may also indicate the kinds of neutral content of a domain. For example, "my_bank.com" 308 is classified as "Financial," and "us.social_network.com" 316 is classified as "Social Networking" Different values for classification field 306 may exist for any applicable category or type of malware.

When a user at client 102 clicks on a link, such as link 212a illustrated in FIG. 2, link protection server 218 may query reputation database 110 for link 212a using, for example, the URL ("www.example1.com") of link 212a. As shown in FIG. 3, link 212a may be associated with entry 324 in reputation database 110. As shown in FIG. 2, link 212a is redirected through links 212b and 212c until it reaches it final destination at link 212n. Link protection server 218 may additionally query reputation database 110 for links 212b, 212c and 212n using the URLs associated with each link. Link 212n may be associated with entry 326 in reputation database 110 illustrated in FIG. 3, which indicates that link 212n is associated with a Trojan virus. Link protection server 218 may associate the reputation for link 212n with the reputation for link 212a indicating that link 212a is associated with a malicious activity because the content of the final destination 212n of link 212a is a Trojan virus. Link reputation server 218 may then update the reputation associated with entry 324 (e.g., link 212a) and replace the values in rating field 303, reputation score field 304 and classification field 306 with the values from entry 326 (e.g., link 212n).

Figure 4:
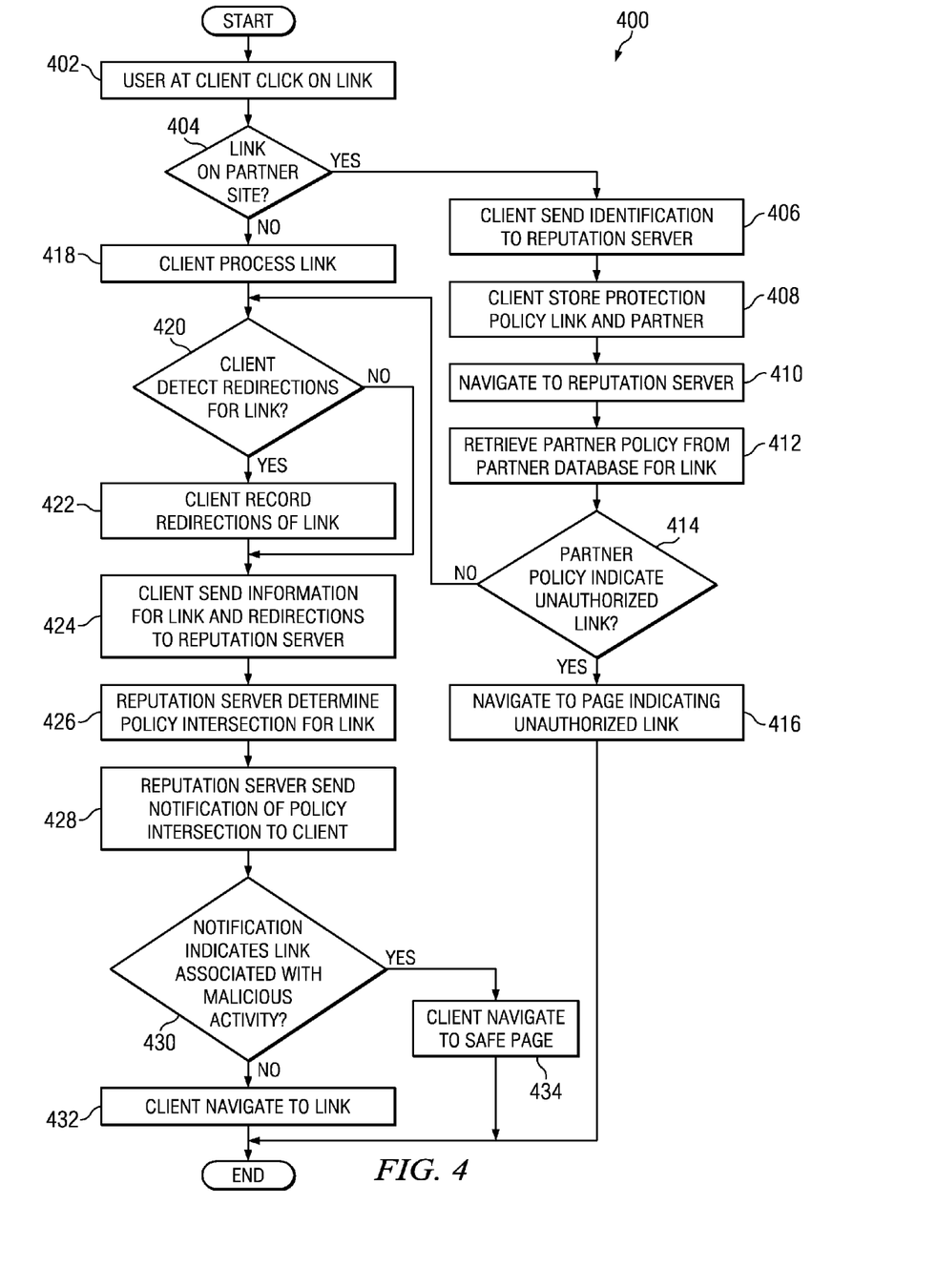
FIG. 4 illustrates a flow chart of a method for protecting against unknown malicious activities if a security application is installed on a client in accordance with the teachings of the present disclosure.

FIG. 4 illustrates a flow chart of a method for protecting against unknown malicious activities if a security application is installed on a client in accordance with the teachings of the present disclosure. Generally, a user at client 102c in FIG. 1 may click on a link to access data at a site via network 108. Security application 114 on client 102c may determine if there are any redirections associated with the link. Security application 114 may record information associated with the link and any associated redirections and may send the information to reputation server 106. Reputation server 106 may use the information associated with the link and any redirections to determine a policy intersection for the link that indicates whether the link is associated with a malicious activity. Reputation server 106 may then send the policy intersection to client 102c such that client 102c may determine whether it is safe to navigate to the link or whether the link is associated with a malicious activity and access to the site should be blocked.

Method 400 starts at step 402 when a user at client 102c in FIG. 1 clicks on a link to access data at a site available over network 108. At step 404, client 102c determines whether the link is located on a partner site. In one embodiment, a partner site may be any site that includes a script (e.g., server reputation script 116 on partner server 104 in FIG. 1) or other instructions for pointing the outbound links on the partner site to an address associated with reputation server 106. If the link is on a partner site, client 102c sends an identification to reputation server 106 at step 406 indicating that security application 114 is installed on client 102c. Client 102c then stores a protection policy, the link and the partner name at step 408. Client 102c navigates to reputation server 106 at step 410 and reputation server 106 queries partner database 112 to retrieve the partner policy for the partner site at step 412. In one embodiment, the partner policy may include links and the associated content that may not be accessed while on the partner site. Reputation server 106 may then determine if the partner policy for the partner site indicates that the link is an unauthorized link at step 414. If the partner policy indicates that the link is an unauthorized link at step 416, client 102c navigates to a page indicating that the link clicked on by the user cannot be accessed from the partner site because it includes unauthorized content. If the partner policy indicates that the link is an authorized link at step 414, the method moves to step 420.

If at step 404 the link is not included on a partner site, client 102 processes the link at step 418. Processing the link may include collecting information such as the domain name, URL or address for the link and following the link to the final destination without displaying the site to the user at client 102c. At step 420, client 102c determines if the link was redirected to reach the final destination. If client 102c detects that the link was redirected, client 102c records each of the redirections between the link and the final destination at step 422. Client 102c may record the domain name or URL and/or the address, such as the IP address, associated with each of the redirections. If client 102 does not detect any redirections, the method moves to step 424.

At step 424, client 102c sends information associated with the link and any redirections to reputation server 106. In one embodiment, the information associated with the link and any redirections may be identification information, such as a domain name, a URL or an address. In another embodiment, the information may include identification information for the link and associated redirections and a protection policy (e.g., a protection policy from protection policy database 210 in FIG. 2) for client 102c. Protection policy may include rules indicating when client 102c should be prevented from navigating to the link because it may be associated with a malicious activity. At step 426, reputation server 106 may determine a policy intersection for the link based on the information associated with the link and associated redirections received from client 102c. The details of determining a policy intersection for the link are described below with respect to FIG. 6. Once reputation server 106 determines the policy intersection for the link, reputation server 106 sends a notification to client 102c including the policy intersection for the link at step 428.

At step 430, client 102 determines if the notification including the policy intersection indicates that the link is associated with a malicious activity. If the link is not associated with a malicious activity, client 102c navigates to the final network destination of the link at step 432 in order to display the data at the site to the user. If the link is associated with a malicious activity, client 102c navigates to a safe page indicating that the link is associated with a malicious activity at step 434.

Method 400 may be implemented using the system of FIGS. 1-3, or any other system operable to implement method 400. As such, the preferred initialization point for method 400 and the order of the steps comprising method 400 may depend on the implementation chosen. In some embodiments, some steps may be optionally omitted, repeated, or combined. In some embodiments, portions of method 400 may be combined. In certain embodiments, method 400 may be implemented partially or fully in software embodied in computer-readable media.

Figure 5:
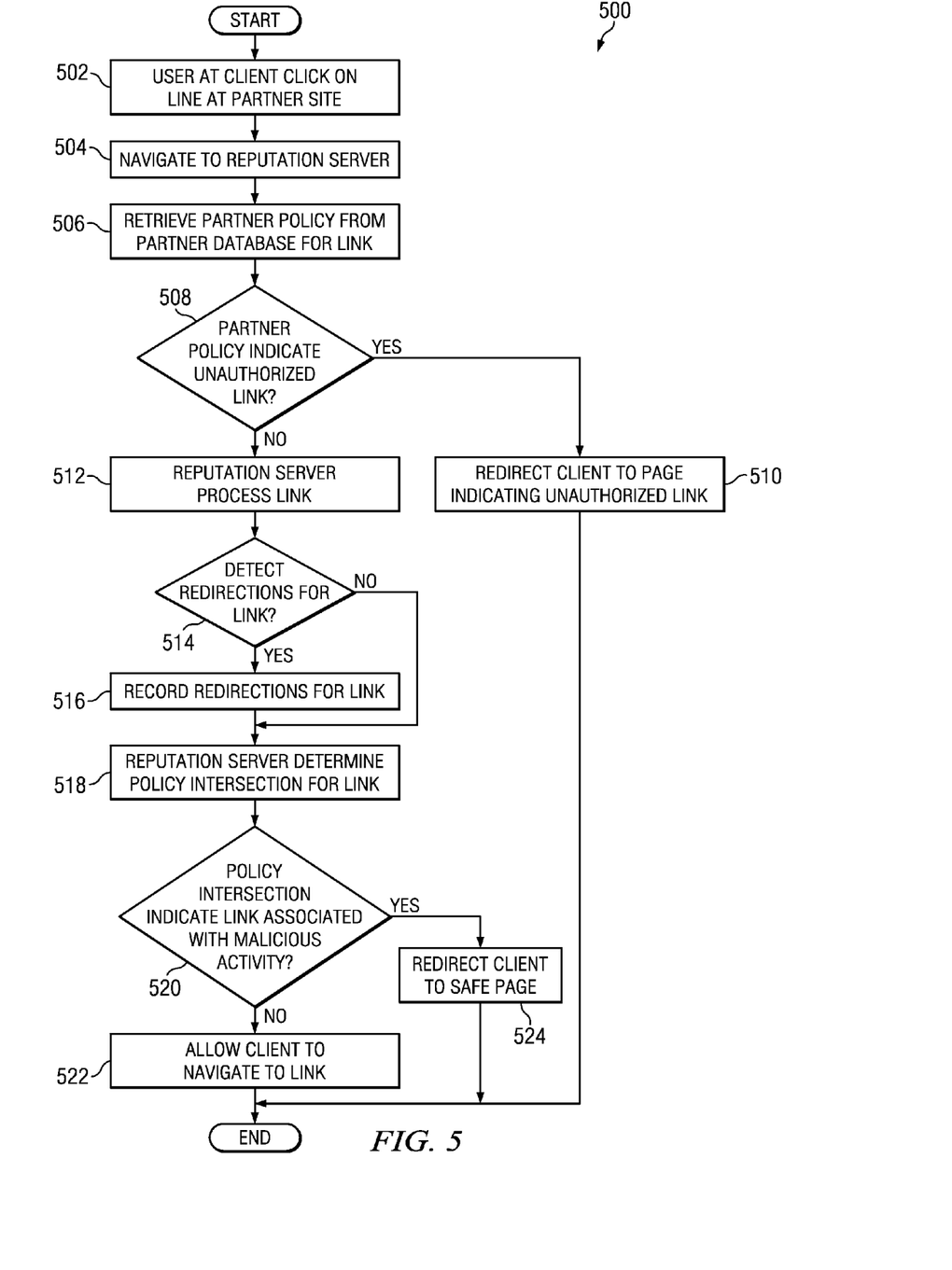
FIG. 5 illustrates a flow chart of a method for protecting against unknown malicious activities if a security application is not installed on a client in accordance with the teachings of the present disclosure.

FIG. 5 illustrates a flow chart of a method for protecting against unknown malicious activities if a security application is not installed on a client in accordance with the teachings of the present disclosure. Generally, a user at, for example, client 102a in FIG. 1 may click on a link while on a partner site to access data at another site via network 108. As noted in FIG. 1, security application 114 is not installed on client 102a. Reputation server script 116 on partner server 104 may navigate to reputation server 106 because client 102a has not sent notification to reputation server 106 that security application 114 is installed on client 102a. Security application on reputation server 106 may record information associated with the link and any redirections. Reputation server 106 may use the information associated with the link and any redirections to determine a policy intersection for the link that indicates whether the link is associated with a malicious activity. Reputation server 106 may determine based on the policy intersection whether it is safe to navigate to the link or whether the link is associated with a malicious activity and access to the site should be blocked.

Method 500 starts at step 502 when a user at client 102a in FIG. 1 clicks on a link with a partner site to access data at another site available over network 108. Because security application 114 is not installed on client 102a, client 102a navigates to reputation server 106 at step 504. The navigation may be accomplished when a script (e.g., server reputation script 116 on partner server 104 in FIG. 1) or other instructions are included in the partner site such that all outbound links on the partner site point to an address associated with reputation server 106. Navigation to reputation server 106 may be transparent to the user but reputation server 106 may be able to collect the appropriate information associated with the link in order to determine if the link is associated with a malicious activity.

At step 506, reputation server 106 may query partner database to retrieve a partner policy associated with the partner site. In one embodiment, the partner may be identified by a domain name and/or address associated with the partner site. Reputation server 106 may then determine if the partner policy for the partner site indicates that the link is an unauthorized link at step 508. If the partner policy indicates that the link is an unauthorized link at step 510, client 102a is redirected to a page indicating that the link clicked on by the user cannot be accessed from the partner site because it includes unauthorized content. If the partner policy indicates that the link is an authorized link at step 508, reputation server 106 processes the link at step 512. Processing the link may include collecting information such as the domain name, URL or address for the link and following the link to the final destination without displaying the site to the user at client 102a.

At step 514, reputation server 106 determines if the link was redirected to reach the final destination. If reputation server 106 detects that the link was redirected, reputation server 106 records each of the redirections between the link and the final destination at step 516. Reputation server 106 may record the domain name or URL and/or the address, such as the IP address, associated with each of the redirections. If reputation server 106 does not detect any redirections, the method moves to step 518.

At step 518, reputation server 106 may determine a policy intersection for the link based on the information associated with the link and associated redirections. In one embodiment, the information associated with the link and any redirections may be identification information, such as a domain name, a URL or an address. In another embodiment, the information may include identification information for the link and associated redirections and a protection policy. Protection policy may include rules indicating when client 102a should be prevented from navigating to the link because it may be associated with a malicious activity. The details of determining a policy intersection for the link are described below with respect to FIG. 6.

At step 520, reputation server 106 determines if the policy intersection indicates that the link is associated with a malicious activity. If the link is not associated with a malicious activity, reputation server 106 navigates to the final network destination of the link at step 522 in order to display the data at the site to the user at client 102a. If the link is associated with a malicious activity, reputation server 106 navigates to a safe page indicating that the link is associated with a malicious activity at step 524.

Method 500 may be implemented using the system of FIGS. 1-3, or any other system operable to implement method 500. As such, the preferred initialization point for method 500 and the order of the steps comprising method 500 may depend on the implementation chosen. In some embodiments, some steps may be optionally omitted, repeated, or combined. In some embodiments, portions of method 500 may be combined. In certain embodiments, method 500 may be implemented partially or fully in software embodied in computer-readable media.

Figure 6:
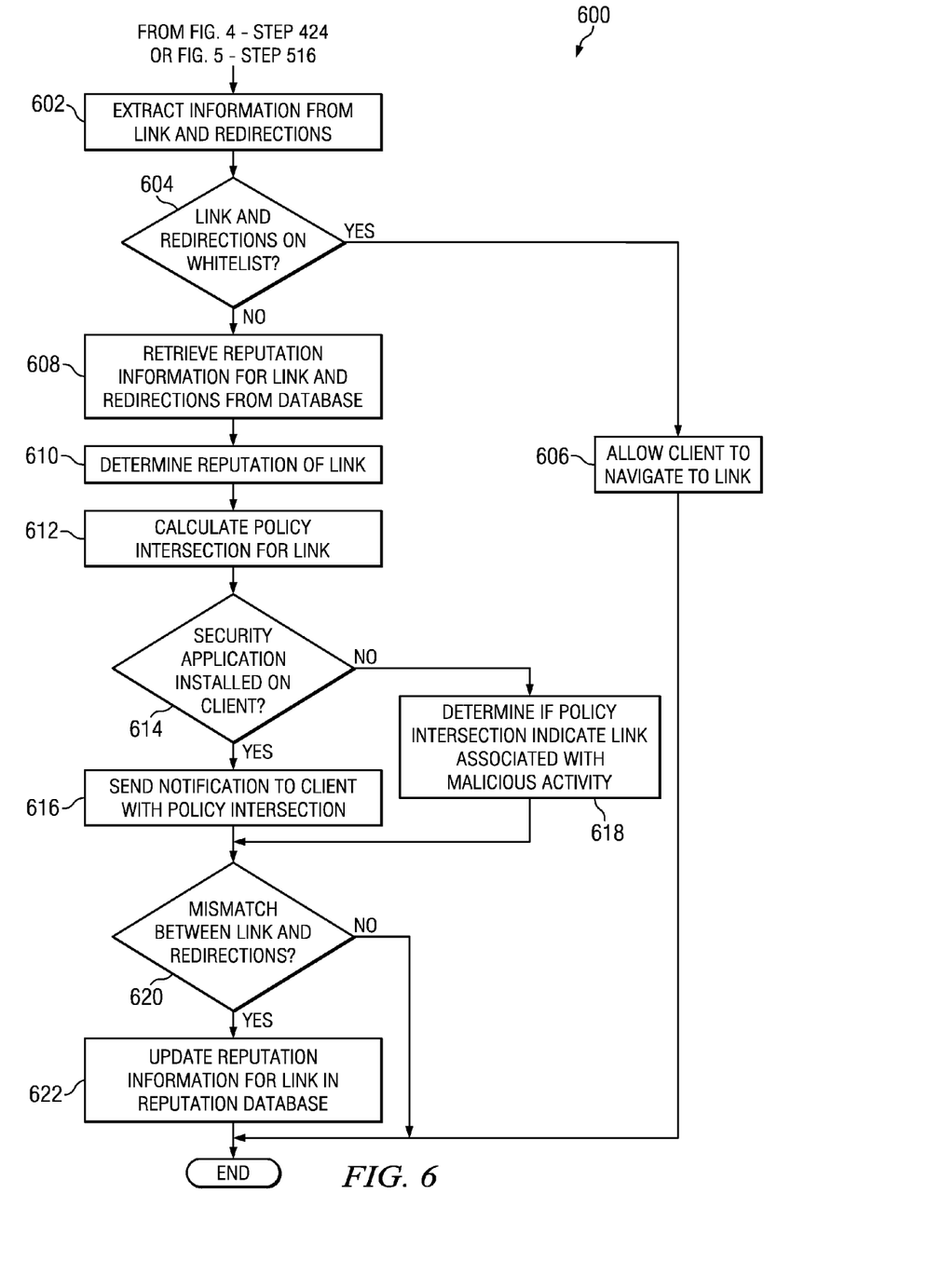
FIG. 6 illustrates a flow chart of a method for determining a reputation of a link in accordance with the teachings of the present disclosure.

FIG. 6 illustrates a flow chart of a method for determining a reputation of a link in accordance with the teachings of the present disclosure. Generally, reputation server 106 in FIG. 1 receives information about a link either directly from a client (see step 424 of FIG. 4) or indirectly from a client through partner server 104 (see step 516 of FIG. 5). Reputation server 106 extracts identification information about the link and any associated redirections and retrieves reputation information from reputation database 110 for the link and associated redirections. Reputation server 106 determines the reputation of the link based on one or more of the reputations of the associated redirections and then calculates a policy intersection for the link based on the determined reputation. If there is a mismatch between the reputation information for the link and any one of the redirections, reputation server 106 updates the reputation information for the link in reputation database 110.

Method 600 may be used to determine the policy intersection as found in method 400 at step 426 and in method 500 at step 518. At step 602, reputation server 106 extracts the information associated with the link and any redirections. In one embodiment, the information associated with the link and any redirections may be identification information, such as a domain name, a URL or an address. In another embodiment, the information may include identification information for the link and associated redirections and a protection policy for the partner site. At step 604, reputation server 106 determines whether the link and associated redirections are on a whitelist indicating that the content of the site is not associated with a malicious activity. If the link and associated redirections are on a whitelist, reputation server 106 allows client 102 to navigate to the link without determining the reputation of the link. When a security application is installed on a client, such as client 102c in FIG. 1, reputation server 106 may send a notification to client 102 indicating that the link is on a whitelist. When a security application is not installed on a client, such as clients 102a and 102b in FIG. 1, reputation server 106 may navigate to the link such that the data from the site is displayed on clients 102a and 102b.

If one or more of the link and associated redirections are not on a whitelist, reputation server 106 may query reputation database 110 to retrieve the reputations for the link and associated redirections at step 608. Reputation server 106 may then determine the reputation of the link at step 610 based on one or more of the reputations of the associated redirections. In one embodiment, the reputation of the link may be based on the redirection having the lowest reputation score. In another embodiment, the reputation for the link may be based on an average of the reputation scores for the link and any associated redirections. In a further embodiment, the reputation for the link may be based on the reputation information for the final destination (e.g., the last redirection).

At step 612, reputation server 106 may calculate a policy intersection for the link based on the determined reputation and a protection policy. The protection policy may include rules for determining when client 102 may be blocked from navigating to a link. When a security application is installed on a client, such as client 102c in FIG. 1, reputation server 106 may receive the protection policy from client 102c. When a protection application is not installed on a client, such as clients 102a and 10b in FIG. 1, reputation server 106 may retrieve the protection policy from a protection policy database that is integral to or separate from reputation server 106.

Once reputation server 106 calculates the policy intersection for the link, at step 614 reputation server 106 may determine whether a security application, such as security application 114 in FIG. 1, is installed on client 102. If security application 114 is installed on the client, such as client 102c in FIG. 1, reputation server 106 sends a notification to client 102c with the policy intersection for the link at step 616. Step 616 may be similar to step 428 of method 400 in FIG. 4. If security application 114 is not installed on the client, such as client 102a or 102b, reputation server 106 determines whether the policy intersection indicates that the link is associated with a malicious activity at step 618. Step 618 may be similar to step 520 of method 500 in FIG. 5.

At step 620, reputation server 106 may determine if there is a mismatch in the reputation information associated with the link and the information associated with the redirections. In one embodiment, a mismatch may occur if the reputation information associated with the link that is stored in reputation database 110 is not the same as the reputation information associated with on or more of the redirections that is stored in reputation database 110. In one embodiment, a mismatch may occur if the reputation scores of the link and the redirections are not the same. In another embodiment, a mismatch may occur if the content of the link and the redirections are not the same. If there is a mismatch, reputation server 106 may update the reputation information associated with the link in reputation database 110 at step 622. In one embodiment, the reputation for the link may be based on the redirection having the lowest reputation score. In another embodiment, the reputation for the link may be based on an average of the reputation scores for the link and any associated redirections. In a further embodiment, the reputation for the link may be based on the reputation information for the final destination (e.g., the last redirection). If the reputations of the link and the redirections match, method 600 may end.

Method 600 may be implemented using the system of FIGS. 1-3, or any other system operable to implement method 600. As such, the preferred initialization point for method 600 and the order of the steps comprising method 600 may depend on the implementation chosen. In some embodiments, some steps may be optionally omitted, repeated, or combined. In some embodiments, portions of method 600 may be combined. In certain embodiments, method 600 may be implemented partially or fully in software embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A method for determining a reputation for a link, comprising:
   receiving an original link and a redirected link at a reputation server from a client;
   receiving a protection policy from the client, the protection policy including rules indicating whether the client should be prevented from navigating to the original link;
   querying a database including reputation information associated with a plurality of links by a reputation server to retrieve a reputation of the redirected link, the reputation information indicating whether the links are associated with a malicious activity;
   associating the reputation of the redirected link with the original link to create a reputation of the original link;
   causing the reputation of the original link to be stored in the database, the reputation of the original link created from the reputation of the redirected link;
   querying the database to retrieve the reputation of the original link upon a subsequent action by a client;
   utilizing the reputation of the original link for the subsequent action;
   calculating a policy intersection based on the reputation of the original link and the protection policy, the policy intersection indicating whether the original link is associated with the malicious activity; and
   sending a notification to the client including the policy intersection for the original link indicating whether the original link is associated with the malicious activity.

2. The method of claim 1, further comprising:
   receiving a notification from the reputation server at a client including the reputation of the original link; and
   calculating a policy intersection based on the reputation of the original link and a protection policy including rules indicating whether the client should be prevented from navigating to the original link; and
   providing an indication to block access to the original link if the policy intersection indicates that the original link is associated with the malicious activity.

3. The method of claim 1, further comprising updating the database with the reputation of the original link.

4. The method of claim 1, further comprising:
   querying the database to retrieve the reputation of the original link;
   determining whether the reputation of the original link matches the reputation of the redirected link; and
   updating the reputation of the original link to include the reputation of the redirected link if the reputations of the link and the redirected destination do not match.

5. The method of claim 1, further comprising providing an indication to block access to the original link at the client if the reputation of the original link indicates that the original link is associated with the malicious activity.

6. The method of claim 1, further comprising navigating to a final destination associated with the original link at the client if the notification indicates that the original link is not associated with the malicious activity.

7. The method of claim 1, further comprising receiving the original link at the reputation server from a partner site hosted by a partner server based on a script operable to redirect the original link to point to the reputation server.

8. The method of claim 1, wherein the redirected link is a final destination associated with the original link.

9. The method of claim 1, wherein the redirected link is an intermediate destination associated with the original link.

10. The method of claim 1, wherein the reputation information associated with the links comprises at least one of a rating, a reputation score and a content type.

11. A system for determining a reputation of a link, comprising:
a database including reputation information associated with a plurality of links, the reputation information indicating whether the links are associated with a malicious activity;
a processor;
a computer readable memory; and
processing instructions encoded in the computer readable memory, the processing instructions, when executed by the processor, operable to perform operations comprising:
querying the database to retrieve a reputation of a redirected link;
receiving an original link and the redirected link at the reputation server from a client;
receiving a protection policy from the client, the protection policy including rules indicating whether the client should be prevented from navigating to the original link;
associating the reputation of the redirected link with the original link to create a reputation of the original link;
storing the reputation of the original link to be stored in the database, the reputation of the original link created from the reputation of the redirected link;
querying the database to retrieve the reputation of the original link upon a subsequent action by a client;
utilizing the reputation of the original link for the subsequent action;
calculating a policy intersection based on the reputation of the original link and the protection policy, the policy intersection indicating whether the original link is associated with the malicious activity; and
sending a notification to the client including the policy intersection for the original link indicating whether the original link is associated with the malicious activity.

12. The system of claim 11, wherein the processing instructions are further operable to perform operations comprising updating the database with the reputation of the original link.

13. The system of claim 11, wherein the processing instructions are further operable to perform operations comprising:
querying the database to retrieve the reputation of the original link;
determining whether the reputation of the original link matches the reputation of the redirected link; and
updating the reputation of the original link to include the reputation of the redirected link if the reputations of the link and the redirected destination do not match.

14. The system of claim 11, wherein the processing instructions are further operable to perform operations comprising receiving the original link at the reputation server from a partner site hosted by a partner server based on a script operable to redirect the original link to point to the reputation server.

15. The system of claim 11, wherein the redirected link is a final destination associated with the original link.

16. The system of claim 11, wherein the redirected link is an intermediate destination associated with the original link.

17. The system of claim 11, wherein the reputation information associated with the links comprises at least one of a rating, a reputation score and a content type.

18. A non-transitory computer readable medium storing instructions for determining a reputation of a link, the instructions, when executed by a processor, configured to:
determine an original link and a redirected link associated with the original link encountered at a client;
retrieve a protection policy from a protection policy database associated with the client;
query a database including reputation information with the original link and the redirected link to determine whether the links are associated with a malicious activity;
associate the reputation of the redirected link with the original link to create a reputation of the original link;
cause the reputation of the original link to be stored in the database, the reputation of the original link created from the reputation of the redirected link;
query the database to retrieve the reputation of the original link upon a subsequent action by the client;
utilize the reputation of the original link for the subsequent action; and
calculate a policy intersection for the original link based on the reputation of the original link and the policy intersection, the policy intersection indicating whether the original link is associated with the malicious activity.

19. The non-transitory computer readable medium of claim 18, wherein the instructions are further configured to block access to the original link if the policy intersection indicates that the original link is associated with the malicious activity.

20. The non-transitory computer readable medium of claim 18, wherein the redirected link is a final destination associated with the original link.

21. The non-transitory computer readable medium of claim 18, wherein the redirected link is an intermediate destination associated with the original link.

22. A non-transitory computer readable medium storing instructions for determining a reputation of a link, the instructions, when executed by a processor, configured to:
receive an original link and a plurality of redirected links from a client;
receive a protection policy from the client, the protection policy including rules indicating whether the client should be prevented from navigating to the original link;
query a database including reputation information associated with the plurality of links by a reputation server to retrieve a reputation of each of a plurality of redirected links, the reputation information indicating whether the links are associated with a malicious activity;
determine a reputation of the original link based on at least one of:
reputation of the redirected link of the plurality of links including a lowest reputation score;
an average reputation score of the reputations of the plurality of redirected links; and
reputation of the redirected link representing a final destination for the original link;
cause the reputation of the original link to be stored in the database, the reputation of the original link created from the reputation of the redirected links;
query the database to retrieve the reputation of the original link upon a subsequent action by a client;
utilize the reputation of the original link for the subsequent action;
calculate a policy intersection based on the reputation of the original link and the protection policy, the policy intersection indicating whether the original link is associated with the malicious activity; and send a notification to the client including the policy intersection for the original link indicating whether the original link is associated with the malicious activity.

23. The non-transitory computer readable medium of claim 22, further comprising instructions configured to provide an indication to block access to the original link at the client if the reputation of the original link indicates that the original link is associated with the malicious activity.

24. The non-transitory computer readable medium of claim 22, further comprising instructions configured to receive the original link at the reputation server from a partner site hosted by a partner server based on a script operable to redirect the original link to point to the reputation server.

* * * * *